United States Patent [19]
Gombos et al.

[11] Patent Number: 5,343,670
[45] Date of Patent: * Sep. 6, 1994

[54] METHOD OF FORMING SELECTED SIZE AND WEIGHT BALES OF HAY INTO A SELECTED SIZE AND WEIGHT NON-PALLETIZED UNIT

[75] Inventors: John M. Gombos, Bakersfield; Moshe Leashno, Long Beach, both of Calif.

[73] Assignee: A.C.X. Trading, Inc., Bakersfield, Calif.

[*] Notice: The portion of the term of this patent subsequent to Feb. 25, 2009 has been disclaimed.

[21] Appl. No.: 987,120

[22] Filed: Dec. 8, 1992

Related U.S. Application Data

[60] Division of Ser. No. 674,863, Mar. 25, 1991, Pat. No. 5,175,981, which is a continuation-in-part of Ser. No. 526,186, May 18, 1990, abandoned, which is a continuation-in-part of Ser. No. 353,811, May 17, 1989, Pat. No. 5,001,974.

[51] Int. Cl.⁵ .................. B65B 5/10; B65B 25/02; B65B 27/12; B65B 35/50
[52] U.S. Cl. .................. 53/399; 53/435; 53/436; 53/441; 53/447; 53/475
[58] Field of Search ........ 414/341, 347, 399; 53/435, 436, 438, 244, 399, 441, 447, 474, 473, 475, 449

[56] References Cited

U.S. PATENT DOCUMENTS

| | | | |
|---|---|---|---|
| 3,788,496 | 1/1974 | Webb et al. | 414/347 X |
| 3,828,662 | 8/1974 | Pinkham | 53/447 X |
| 3,884,935 | 5/1975 | Burns, III | |
| 3,986,611 | 10/1976 | Dreher | |
| 4,171,178 | 10/1979 | Birkenfeld et al. | 414/341 X |
| 4,248,031 | 2/1981 | Del Pozo, Jr. | 53/556 X |
| 4,418,510 | 12/1983 | Lancaster, III et al. | 53/441 X |
| 4,593,517 | 6/1986 | Mattila | 53/556 X |
| 4,722,170 | 2/1988 | Ball et al. | 53/588 X |
| 4,763,574 | 8/1988 | Ast | 100/188 R X |
| 4,858,415 | 8/1989 | Hake | 53/556 X |
| 5,016,424 | 5/1991 | Stirling | 53/475 X |
| 5,090,177 | 2/1992 | Gombos et al. | 53/447 X |

FOREIGN PATENT DOCUMENTS

| | | | |
|---|---|---|---|
| 3344940 | 6/1985 | Fed. Rep. of Germany | 53/556 |
| 2216489A | 10/1989 | United Kingdom | |

OTHER PUBLICATIONS

"Fantastic Foam" California Farmer, Apr. 1992, pp. 22 and 48.

*Primary Examiner*—Linda B. Johnson
*Attorney, Agent, or Firm*—Baker, Maxham, Jester & Meador

[57] ABSTRACT

A method of unitizing a cargo of multiple substantially identical high density hay bales into multiple non-palletized units capable of being handled by a forklift truck or the like and fitted into shipping containers and utility vehicle cargo spaces comprises the steps of selecting a plurality of substantially identical high density bales of hay, arranging the plurality of bales of hay into selected size stacks of at least one layer of multiple horizontal rows, and wrapping multiple layers of an elongated continuous sheet of pre-stretched polymeric film having a memory horizontally around the plurality of bales of hay.

22 Claims, 4 Drawing Sheets

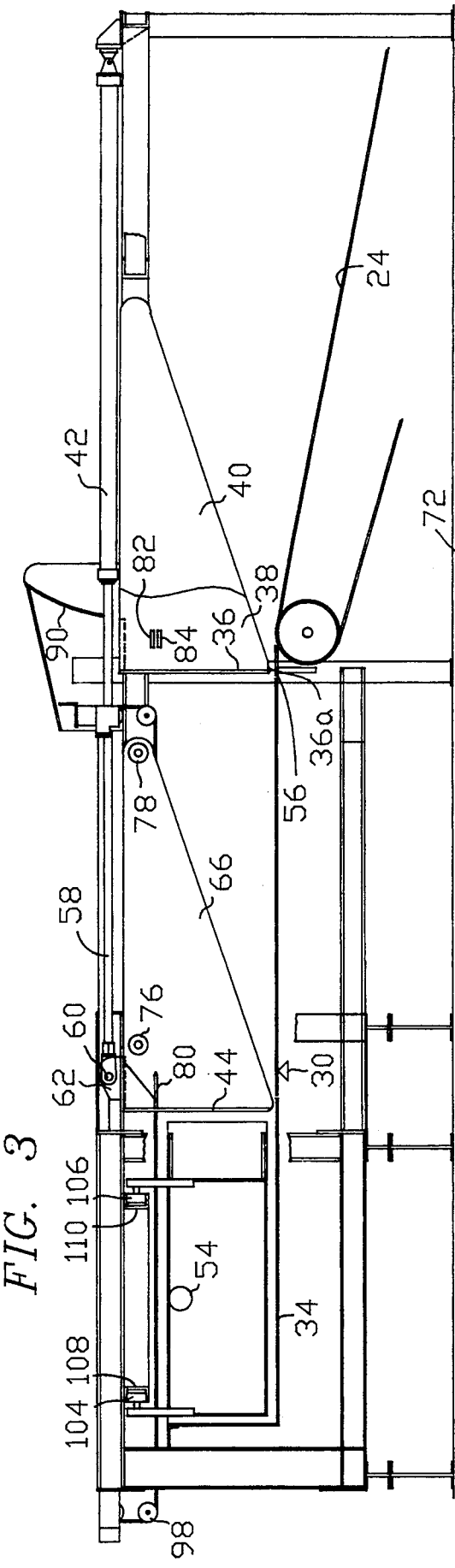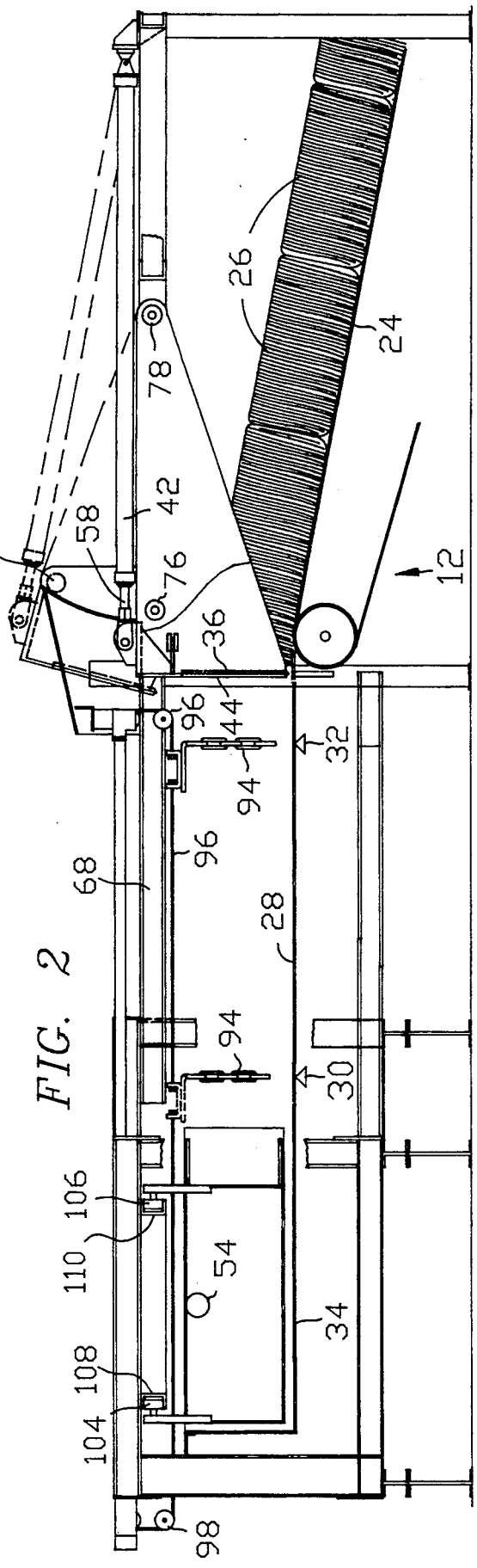

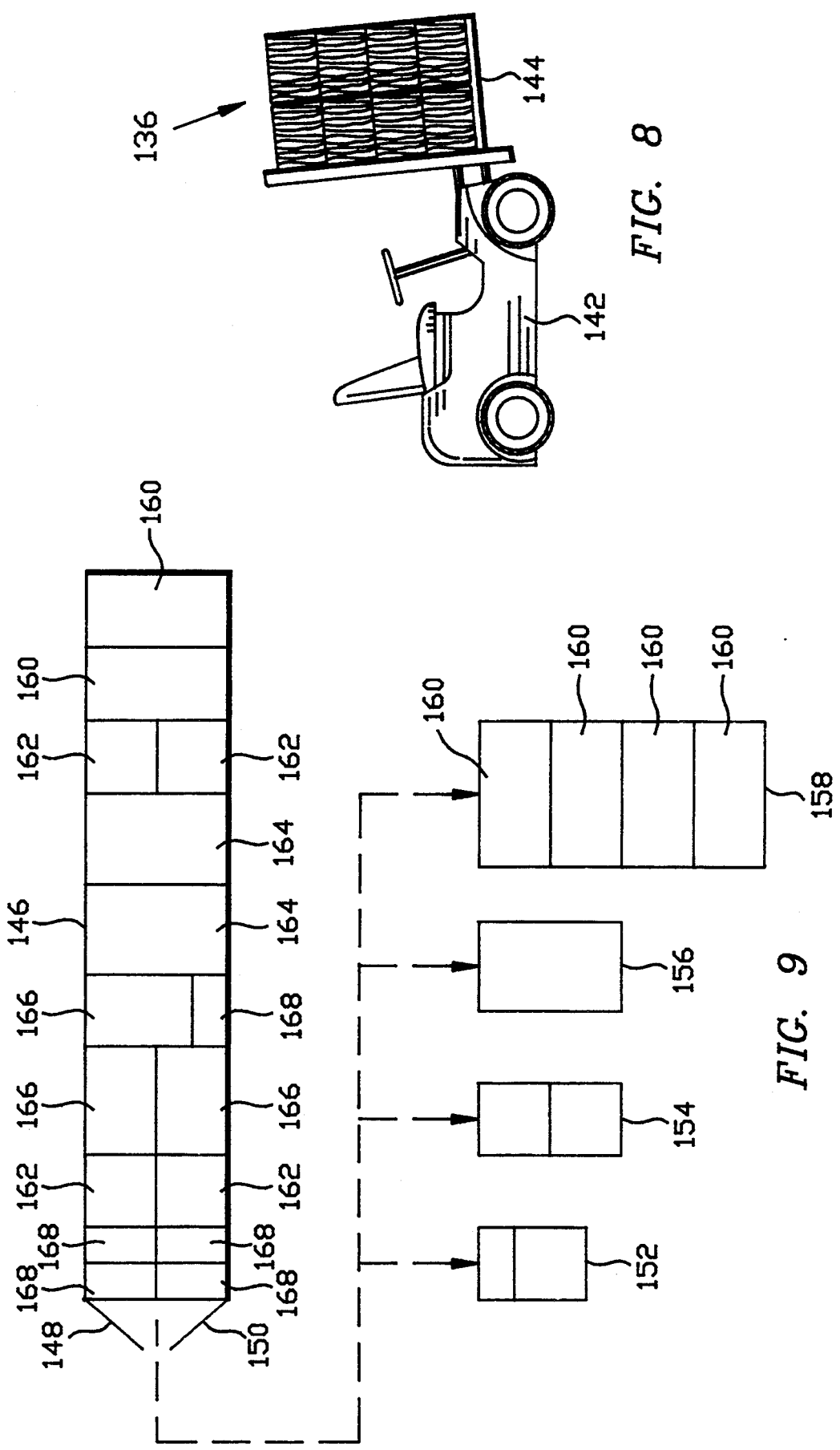

METHOD OF FORMING SELECTED SIZE AND WEIGHT BALES OF HAY INTO A SELECTED SIZE AND WEIGHT NON-PALLETIZED UNIT

REFERENCE TO RELATED APPLICATIONS

The present application is a divisional of co-pending application Ser. No. 07/674,863, filed Mar. 25, 1991, now U.S. Pat. No. 5,175,981, which was a continuation-in-part of co-pending application Ser. No. 07/526,186, filed May 18, 1990, entitled "METHOD AND APPARATUS FOR UNITIZATION OF CARGO", now abandoned, which is a continuation-in-part of co-pending application Ser. No. 07/353,811, filed May 17, 1989, and entitled "HAY BALE RECOMPACTING SYSTEM" now U.S. Pat. No. 5,001,974.

BACKGROUND OF THE INVENTION

The present invention relates to the high density baling of hay and pertains particularly to a method and apparatus for recompacting bales of hay into selective high density uniform size and weight bales, and non-palletized unitization of multiple high density compact bales of hay into selected uniform weight and size units of cargo for optimum utilization of space and for handling by lift trucks and the like.

There has, in recent years, developed an international market for domestically produced hay. In order to meet the needs of this market, the hay must be packaged to provide for efficient and economical handling and shipping. Such economical handling and shipping requires that the packaging be in high density units capable of efficient packaging into shipping containers, efficient mechanical handling, and easily convertible to manual handling. This also requires that the bales also be of substantially uniform size and weight and formable into selectable uniform weight and size cargo units.

In the aforementioned parent application, a system and method is disclosed for recompacting or further compacting bales of hay into higher density bales and cutting them into smaller lighter weight units for easier manual handling. That system provides high density, smaller more easily handled cargo units which are desirable for both ease of loading and fitting into cargo space and for manual handling. However, it is also desirable that these units be substantially equal or uniform in size and weight and be easily formed into selected uniform size and weight larger units for mechanical handling and shipping.

The typical harvesting of hay involves cutting it and drying it in the field, after which it is typically compressed and bound into bales for easier handling and storage. In the past, the typical field baled bale of hay for local use typically weighs about fifty-five to seventy-five pounds and occupies a space of about 48"×23"×17". The weight may vary by as much as 20% under certain circumstances. Bales of this size and weight are generally considered suitable for local manual handling and storage. However, they are considered too bulky for commercial markets and for long distance shipping, particularly for overseas shipping. For this reason, the standard commercial bale is about one-hundred ten pounds and of about the same dimensions as above. Twenty of such bales weigh a standard or metric ton of about twenty-two hundred pounds.

It has been found that such bales weighing fifty Kg or one-hundred ten pounds can be compacted into a single bale of about 18"×24"×20". This is about the same width and height and less than one-half (½) the length of the standard bale. This size and weight bale has a density of about twenty-two pounds per cubic foot. These can then be split into 18"×12"×20" bales and stacked and bound into fractions of one ton, one ton and multiple ton, such as two to twenty ton units for shipment. Also, two bales of the twenty-five Kg or fifty-five pounds weight standard dimension can be compacted into a single bale of the aforesaid size and weight. This recompacting or rebaling conserves considerable cargo space and provides easier handling units for manual handling, but requires some form of unitization for existing mechanical cargo handling and loading equipment, such as forklift trucks.

One form of unitization now used is the mounting of bales of hay on wooden pallets for handling with a forklift truck. The bales are frequently tied or attached to the pallet by means of straps, webbing, netting and by shrink wrap polymer films. However, the pallets take up valuable cargo space and weight and require separate handling and accommodation. They are also of a standard size and restrict or predetermine the size of a cargo unit. Moreover, they are an added cost, not only as a unit but as to handling and space requirements.

In our co-pending application Ser. No. 07/526,186, filed May 18, 1990, now abandoned entitled "METHOD AND APPARATUS FOR UNITIZATION OF CARGO", we disclose a method of unitizing multiple bales of hay for handling by means of a forklift truck without the need for a pallet. That method is more fully discussed hereinbelow.

The shipping of cargo of this type in international trade requires flexibility in the size of cargo units as well as a standardization that can be fit into different size cargo spaces. For example, most cargo is shipped in cargo containers of a standard 8'×8'×40'. However, when they reach their destination, they must fit cargo spaces that may vary from about four to about ten feet in width and from about five to about forty feet in length. They must also be in units of weight that are standard, and can be accommodated by vehicles at the destination, which can vary from one-quarter ton to ten ton capacity. Thus, the units of cargo become multiple parts of a puzzle that must fit in various arrangements in several different weights in several different size cargo spaces.

It is desirable that improved means be available for the formation of bales of hay into suitable size and weight cargo units for easy and efficient handling and shipping.

SUMMARY AND OBJECTS OF THE INVENTION

It is the primary object of the present invention to provide an improved system for the recompacting and formation of bales of hay into compact high density selectable uniform weight and size non-palletized cargo units.

In accordance with a primary aspect of the present invention, a method of unitizing a cargo of multiple high density hay bales into a non-palletized cargo unit capable of being handled by a forklift truck or the like comprises the steps of selecting a plurality of substantially identical high density bales of hay, arranging said plurality of bales of hay into at least one layer of multiple horizontal rows, and wrapping multiple layers of an elongated continuous sheet of pre-stretched polymeric film having a memory horizontally around said plurality of bales of hay for forming a unit of cargo capable of being handled by forklift trucks without a pallet.

Another aspect of the invention includes method and apparatus for further compacting standard bales of hay into bales less than half the standard size, cutting the recompacted bales into two smaller bales for easier handling, and packaging for handling, storage or shipping.

BRIEF DESCRIPTION OF THE DRAWING

The above and other objects and advantages of the present invention will become apparent from the following description when read in conjunction with the accompanying drawings wherein:

FIG. 2 is a side elevation view of the feeding apparatus of the invention;

FIG. 3 is a view like FIG. 2 illustrating the feeding apparatus of the invention illustrating a step in the process of the invention;

FIG. 8 is a side elevation view of a lift truck lifting the stack of FIG. 7; and FIG. 9 is a top plan view illustrating certain steps of carrying out the process of the present invention.

DETAILED DESCRIPTION OF A PREFERRED EMBODIMENT

Figures 1, 10:
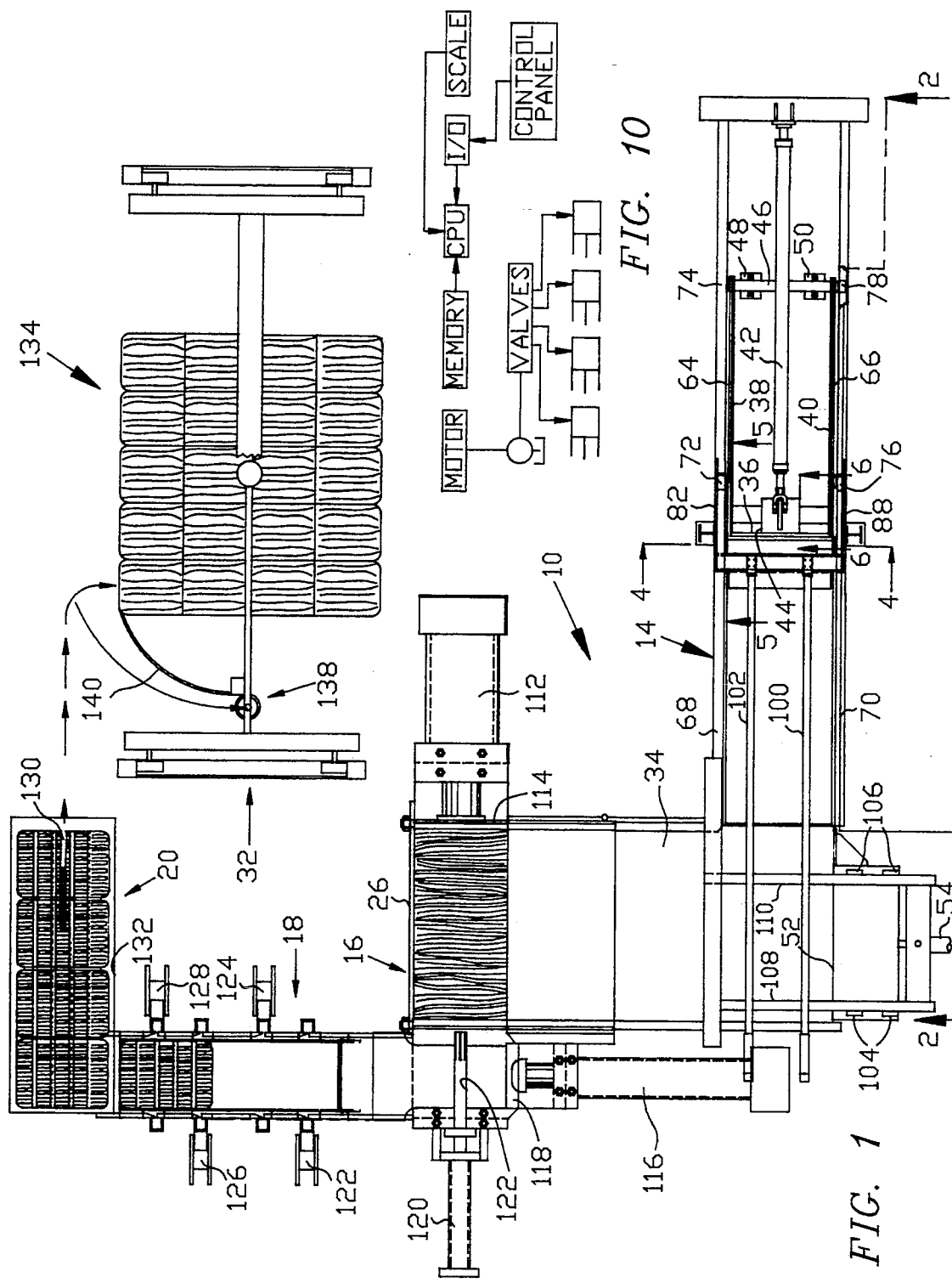
FIG. 1 is top plan view illustrating a preferred embodiment of a hay rebaling system in accordance with the invention.
FIG. 10 is a functional block diagram of controls for the system.

Referring to the drawings, particularly to FIG. 1, there is illustrated a preferred embodiment of the invention comprising a system for further densifying and sizing of bales of hay in accordance with the method of the present invention. The system, in its preferred form, takes a specifically selected charge of hay, feeds it into a compression chamber, and compresses it into a bale of a specific and uniform size and weight, bands the reduced size bale, cuts it into two smaller bales of a uniform size and weight, and forms multiple bales into selected size non-palletized cargo units. The compression and banding features of the overall system are illustrated and described in more detail in the aforementioned parent application, which is incorporated herein by reference as though fully set forth.

The illustrated embodiment, as best seen in FIGS. 1-3, and designated generally by the numeral 10, comprises in its preferred embodiment a conveyor and feeding means or system, designated generally by the numeral 12, for conveying broken bales (i.e., bales wherein the ties have been cut or broken) of hay to a a selective indexing unit 14. The indexing unit 14 in its preferred form includes scales, and a gate or the like for selectively allowing a predetermined amount or weight of hay onto the scale, and means for moving the predetermined weight of hay onto an indexing table. This can be one standard bale of the desired weight, or any predetermined amount. Thereafter, the indexing unit feeds it into a compression chamber, designated generally by the numeral 16, where the hay is compressed into a substantially smaller bale of about twenty inches in length. This compressed bale is extruded transverse to the compression chamber through a strapping chamber, designated generally by the numeral 18. In the strapping chamber, the bales are bound with two pairs of straps by strapping means, and then passed to a cutting unit for cutting the bales into uniform units. The bales then pass through cutting means, such as a saw at 20 for cutting them into smaller bales. These smaller bales are then selectively arranged into predetermined size and weight stacks, and bound into cargo units by a film stretch wrap apparatus and process designated generally at 138.

The conveyor 12 may be of any suitable well known type, such as a belt conveyor, with a belt 24 that continuously runs and preferably is adjustable in speed to accommodate or provide adequate feeding for the compressing function. A belt conveyor that enables the load to slip thereon (i.e. the belt to continuously run beneath the bale) is suitable. The conveyor feeds bales 26 of hay onto the indexing platform 28, which in its preferred form is a platform of a scale. The scale platform 28 is supported on a plurality of load cells 30 and 32 of an electronic scale, which is responsive to activate control means for activating a gate unit, which pivots down to stop further feeding of hay onto the scale platform. Suitable scales are commercially available and any suitable type may be utilized, such as for example that disclosed in U.S. Pat. No. 4,601,356, which is incorporated herein by reference as thought fully set forth. After a suitable load of hay is pressed onto the first indexing platform 28, a gate 36 descends and prevents further hay from being moved onto the platform 28 by the conveyor belt. The gate 36 is preferably a blade or shear that is vertically reciprocable on guide arms 38 and 40 by means of a linear air or hydraulic motor 42. The arms or plates 38 and 40 are secured to and pivot on a shaft 46 journaled in a pair of spaced bearings 48 and 50 (FIG. 1).

The indexing unit (FIGS. 1-3) comprises a second or stationary horizontal support platform 34 on which the bales of hay are pushed from the scale platform by a pusher blade 44 powered by the ram or motor 42. Thereafter, an indexing blade 52 powered by a ram or motor 54 moves the charge of hay into the inlet side of the compression chamber of the press.

The indexing ram comprises a hydraulic ram or cylinder 54 mounted on a support frame or member 55. A piston rod 38 is connected to the ram piston (not shown) at one end and to a platen or ram head 52, which engages and moves bales 26 sequentially in the compression chamber 16 of the press.

Figure 6:
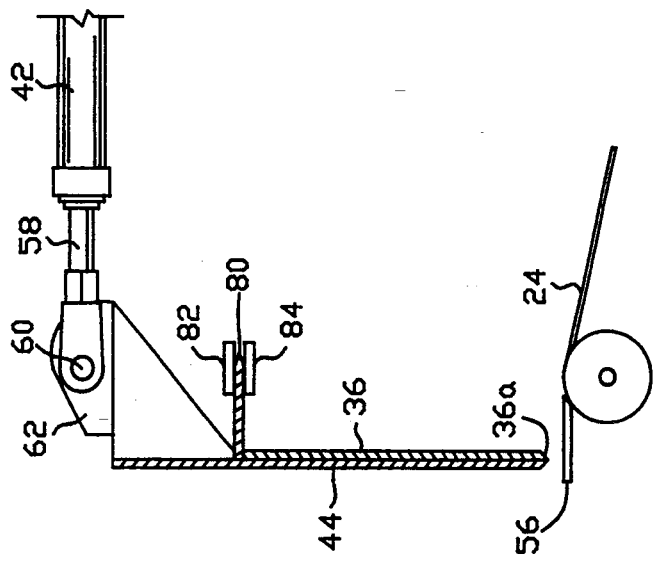
FIG. 6 is a detailed view taken generally on line 6—6 of FIG. 1.
Figure 4:
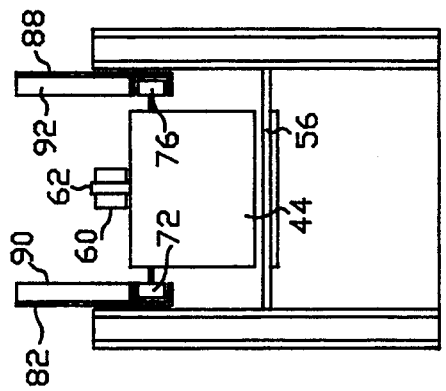
FIG. 4 is a view taken generally on line 4—4 of FIG. 1.

The indexing blade 36 or stop blade 36 and the pusher blade 44 nest together in the retracted position, as shown in FIG. 2, and in FIG. 6 where they also are lifted together by means of the ram 42. The holding blade or gate 36 rests or nests inside the pusher blade assembly and pivots on the shafts 46 (FIG. 1) as previously explained. When the blade 36 descends to the position as shown in FIGS. 2 and 3, the lower tip thereof 36a may engage a fixed or stationary platen member 56 (FIG. 6) to sever or shear any hay that may extend therebetween. The pusher blade 44 preferably has a lower edge that stops just short of the platen 56 (FIG. 6) to insure clearance of the platform 28 as it moves forward to its forward position as shown in FIG. 3.

The linear motor 42 has a piston rod 56, which is pivotally connected at a forward end at 60 to a bracket member 62 secured to the top portion of the pusher blade 44. The pusher blade 44 is secured between a pair of triangular shaped side plates 64 and 66, which rest outside the plates 38 and 40 when in the retracted position of FIGS. 1 and 2. These plates support the blade 44 in a pair of U-shaped side rails 68 and 70 by means of pairs of rollers 72 and 74 on side plate 64 and 76 and 78 on side plate 66. The rollers 74 and 78 are positioned coaxially with the shaft 46 when in the retracted position, such that the two blade assemblies may pivot about a common axis to the upwardly fully retracted position, as shown in phantom in FIG. 2. The pusher blade assembly couples to the stop blade assembly by means of a blade 80 disposed behind the blade 44 that extends horizontally between a pair of bars 82 and 84 extending between the side plates 38 and 40 of the stop blade assembly. When coupled together in this manner, as shown in FIGS. 2 and 6, continued retraction of the linear motor 42, because of its lever arm, and because blade 44 is stopped by its engagement with blade 36 and cannot move further back, the entire assembly including side plates 64 and 66 pivots about the shaft 46 and about the pair of rollers 74 and 78, such that both blades rise above the conveyor to the position shown in phantom in FIG. 2. This clears the passage for the movement or passage of bales or portions of bales of hay onto the scale platform 28.

Figure 5:
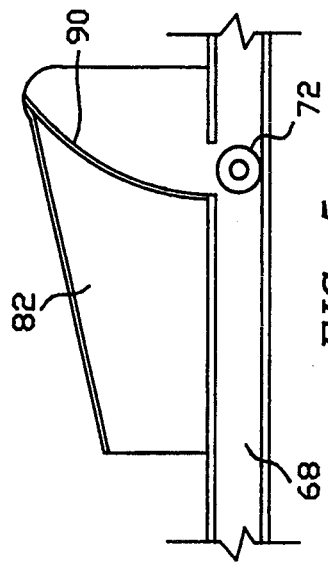
FIG. 5 is a view taken generally on line 5—5 of FIG. 1.

A pair of cam plates 86 and 88 mount a pair of arcuate guides or cams, only one shown at, 90 and 92, against which the rollers 72 and 76 engage or are biased as the motor 42 is activated to push the blade assemblies downward in the stop and pushing positions, as shown in FIGS. 2, 3 and 5.

A moveable backing plate 94 supported on a cable 96, which in turn is supported on a pair of pulleys or sheaves 98 and connected to a pair of air springs or cylinders 100 and 102, as seen in FIG. 1, holds the forward end or forward blocks of a bale upright as it is being moved onto the scale platform 28 and as it is being moved onto the stationary platform 34. The backing plate 94 moves forward ahead of the bale, such as to a position as shown in phantom in FIG. 2, to allow a bale or portions of a bale onto the scale platform. As soon as sufficient weight of bale is on the scale platform, the scale signals through a control system the activation of the motor or cylinder 42, dropping the blade assemblies to the blocking and pushing positions, as shown in FIG. 1, and the pusher blade pushes the predetermined weight bale forward onto the stationary table 34. The cylinder 54 is then activated, pushing the blade 52 forward to push the bale or charge of hay into the compression chamber as previously described. The blade 52 is supported by means of a plurality of rollers 104 and 106 from an overhead track 108 and 110. These are supported from a frame work of beams or beam frame structure as illustrated.

The charge for the bale of hay is typically a standard one-hundred ten pounds, but may be increased a slight amount, such as to one-hundred eleven to one-hundred twelve pounds to accommodate or compensate for waste in further processing, including the cutting of the bales into suitable size. After the charge of hay 26 is loaded into the compression chamber 16, a compression cylinder 112 is activated by high pressure hydraulic fluid, forcing a platen or ram head 114 forward, and the bale forward into the end of the compression chamber where it communicates with the strapping chamber 18.

An extruder cylinder 116 having a ram head 118 on the outer end of the piston rod thereof is then actuated, forcing the bale transverse to the longitudinal axis of the compression chamber into the strapping chamber 18. An air cylinder 120 is mounted at the end of the compression chamber, with a rod 122 that extends into engagement with the bale to hold it together as it is moved into the extrusion chamber. The bale 26 is then forced laterally into the strapping or banding chamber, thereby maintaining the bale in its original orientation. As the bale is moved into the strapping chamber, it is positioned for the placement of a first set of straps, which are placed on the bale by means of a plurality of banding machines as illustrated. These banding machines are preferably of the type available from the STRAPAC Company under the trademark "Sivaron", with a Model No. SS-80Y being the most suitable.

These banding machines are disclosed in the company's instruction manual entitled SIVARON, SS-80Y.SS-80T, which is incorporated herein by reference as though fully set forth. These machines have been developed for the placing of banding straps about packages and the like. Typically, such machines have a rectangular track which surrounds a support table for receiving packages and the like, which are strapped or banded while supported on the table. The machines are typically electrically operated and cycle automatically when activated.

In the present invention, four of these banding machine raceways are positioned to encircle the extrusion or strapping chamber, with the machines 122, 124, 126 and 128 in alternate arrangement on alternate sides of the strapping chamber. The strapping chamber is constructed to have peripheral slots that extend around the entire chamber, and enable the bands to be pulled into the chamber in direct engagement with the bales and bound around the bales of hay. The bales are suitably indexed to place two pairs of bands thereon. These are placed in pairs as the bale is indexed.

The bale is then extruded from the strapping chamber to a cutting unit where a cutting means, such as a saw blade 130, is passed through the bale to sever it into two uniform size and weight bales suitable for handling and shipping. In the illustrated embodiment, a conveyor belt 132 receives the compressed bales 26 and carries them to and through a saw blade 130, where they are cut in two smaller bales 26a and 26b and then carried to a stacking area. The saw may be a circular saw or band saw of the type used for sawing lumber. The details of such saws are well known and such details are not believed necessary herein.

The bales are then stacked in a stack 134 of either single or multiple layers and bound together into larger units, such as one or multiple ton units for mechanized handling. The stack 134 illustrates a cargo unit of twenty bales per layer of four rows of five bales, and preferably contains two layers to make a one ton unit. The resulting bales will be on the order of approximately fifty-five pounds each, and are stacked such as in two layers of twenty for a total of forty bales to form one ton units.

In accordance with operation of the system, the operation is initiated by powering the system up, with motors driving pumps to establish a predetermined pressure in the power system which powers the rams. A control system, such as in parent application Ser. No. 07/353,811, now U.S. Pat. No. 5,001,974 to be granted Mar. 26, 1991, controls operation of the machine. The disclosure thereof is incorporated herein by reference as though fully set forth. A pilot control motor and pumps are operated to provide the necessary pilot control where appropriate. A CPU, which has been previously programmed to initiate and control operation of the system, is activated to initiate operation of the system. The system begins by operation of conveyor 12 for feeding hay onto the first indexing table 28, where an appropriate amount or quantity of hay is selected by weighing, and then activating the gate or knife 36 for cutting off the flow of hay onto the table or scale. The feeding or indexing cylinder 42 is activated and moves the specific weight change of hay onto the indexing table 34. The indexing cylinder 54 is activated to move the charge of hay laterally into the compression chamber 16, wherein the compression ram 112 is activated to compress the hay into the compression chamber, where the extruding cylinder 116 is then actuated to force the bale laterally from the end of the compression chamber into the strapping chamber 18.

As the bale is moved into position in the strapping chamber, a first pair of strapping machines are activated to apply the first set of straps to the bale. Thereafter the bale is further indexed to a second position, wherein a second pair of straps are applied to the bale, and the bale then moved to a position to be cut by the bale cutter into two miniature size bales. The bales are then ejected and then stacked into a stack 134 for shipping or the like.

Figure 7:
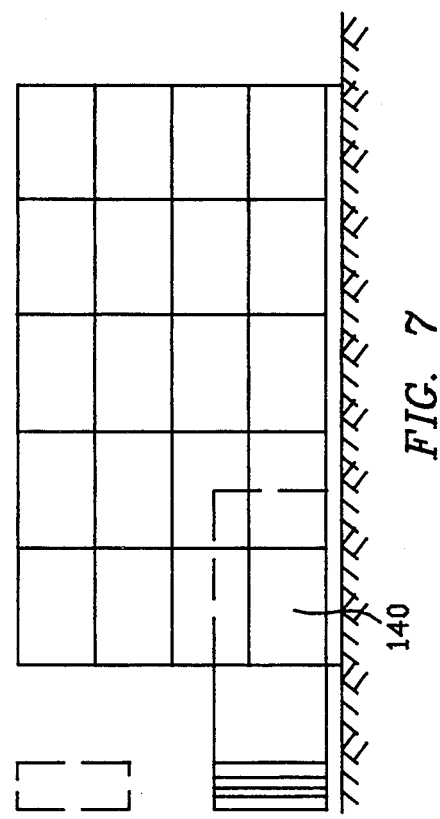
FIG. 7 is a front elevation view of a stack of bales of hay arranged and being bound into a unit in accordance with the present invention.

Referring to FIGS. 1 and 7, the recompressed and resized bales as above described are moved to a position and arranged in a suitable stacked arrangement, as illustrated in FIGS. 1, 7 and 8, for forming into a selected size and weight non-palletized cargo unit. In the illustrated stack of FIG. 1, designated generally by the numeral 134, the stack may consist of two layers of the duly formed bales in arrangements of twenty bales per layer forming a one ton stack. Alternately, the stack may be arranged in four layers of ten bales, each as shown in FIG. 7 as stack 136. This stack may also be considered to be ten columns (vertical stacks) of four bales each. Various other size and shaped cargo units may be selectively formed to provide a desired cargo unit as illustrated in FIG. 8. The present invention provides for forming multiple specific size and weight bales and multiple different size non-palletized cargo units that are compatible with successive cargo spaces as illustrated.

The stack is then unitized in accordance with the present invention by means of a continuous sheet 140 of a suitable polymeric film, such as polypropylene, which is pre-stretched by a suitable apparatus, designated generally as 138, which will be more fully described. The film is wrapped around the peripheral sides of the stack, as illustrated, a number of times sufficient to bind them together as a unit for handling by a forklift truck without a pallet. The cargo unit is formed by this method without a bottom sheet or pallet, as it is commonly used in the prior art. The stack of bales is held together as a unit solely by the peripheral wrapping of pre-stretched film and resultant friction or engagement between adjacent bales. This typically requires on the order of about four to ten layers or wraps, but preferably about seven to eight. The polymeric film may be from about one to three mils. in thickness, but is preferably on the order of one and a half mils. initially and is stretched up to 220%, thereby considerably reducing the thickness of the film and essentially removing any further stretch from the film.

The film has a memory, and once in place, tends to or attempts to return to its original position, thus imposing a compressive force or band around the stack of hay bales sufficient to hold them together as a unit. The film is not elastic like rubber, but returns to original size over a period of time, such as several hours. The film may be pre-stretched from about 25% up to about 220%. The preferred stretch appears to be around 200% to 220% for the present application.

It has been found that this form of unitization of a stack is best accomplished by a lower edge of the film, and an upper edge of the film 140 extending slightly beyond the lower and upper surfaces respectively of the stack, such that the edges overlap and pull inward, essentially enveloping the sides and part of the top and bottom of the bale. This can be accomplished by using a film having a width slightly exceeding that of the height of the stack, or alternately by first overlapping the lower surface of the stack, and moving the film upward until the upper edge overlaps the upper surface.

Film stretching units designated 138 are available which consist of a plurality of roller units driven within a supporting frame, which take a continuous sheet of film 140 from a roll and pass it through spaced apart pairs of rollers which stretch it to the selected amount. Such units are available from TW Mima Corporation, Pompana Beach, Fla. under Model Number JT-21. These are available under the Trademark "Cobra IV".

Selected unitized stacks or layers of bales of hay may be themselves stacked and again further unitized into a larger stack. In such an arrangement, a first stack is unitized by wrapping, and another one or two stacks are similarly wrapped and placed on the lower stack. Thereafter, the entire stack is made up of a combination of three stacks and is again wrapped. This approach provides an arrangement wherein two or more separately wrapped units may be wrapped together as a unit and shipped to its destination. At the destination, the outer wrapping may be removed from the entire cargo unit, leaving the multiple individual cargo units. Thereafter, each unit may be broken and the bales removed therefrom as needed, while the remaining cargo units may be retained in tact by the pre-stretched film. Thus, many smaller modular cargo units may be bundled or bound together in a larger modular unit for shipping, and then broken down into separate modular units for use in final destination.

This unitization can be carried out without the need for mounting or loading the bales on pallets or bottom sheets as would normally be required. It has been found that with from about five to about ten film layers of polypropylene film having an initial 1.5 mil. thickness can effectively bundle or unitize a two to four ton stack of high density bales without the use of pallets. These stacks can be effectively handled with conventional forklift trucks wherein the tines of the fork extend under the stack without the need for pallets. These can be bundled or formed into selected size and weight cargo units for fitting into cargo containers for containerized shipping. This approach eliminates the need for pallets, which take up space and require separate and additional handling. This approach considerably reduces the cost of packaging and shipping.

Referring to FIG. 8, there is illustrated a conventional forklift truck 142 handling a unit of cargo consisting of stack 136 of bales of hay bound together solely by polymer film without a pallet in accordance with the invention. The forks (only one 144 shown) engage the bottom of the stack directly. Only two columns of the bales are engaged by the forks. Therefore, the remaining bales are supported vertically by frictional or binding surface engagement by adjacent bales and the surrounding film.

In a typical example of unitizing, the film is started at the bottom or lower end of the stack, with the lower edge of the film slightly overlapping the lower edge of the stack, and the dispensing unit 138 is carried around the stack by arm wrapping the outer surface of the hay stack with the pre-stretched film. From about four to about ten layers of the film are applied to the lower portion of the stack before the dispensing head begins to move upward to the top, where another four to ten layers are applied around the upper layers of bales on the stack, with the upper edge of the film slightly overlapping the top of the stack. Intermediate the upper and lower layers of film, the layers may be lesser than that at the top and bottom and still retain the unitized unit of cargo.

An alternate approach to the wrapping of stacks of bales of hay includes a turntable which supports a load of hay for rotation. The turntable comprises essentially a base member with suitable driving means for rotating it. A film dispensing head is mounted on a stationary and vertical support member for vertical movement for moving the sheet of film vertically along the rotating stack of hay. The sheet of film, as in previous embodiments, is started preferably at the bottom, but may be started at the top and overlaps as previously described to pull inward along the edge of the bottom surface, and likewise inward along the upper surface to essentially encompass the bales of hay into a unitary cargo. These unitized bales of hay can be handled with forklift trucks as previously described. This eliminates pallets and the expense and handling thereof.

Referring to FIG. 9 of the drawings, there is illustrated another significant aspect of the invention. In accordance with the invention, bales of hay to be shipped are formed into selected size cargo units in accordance with the expected mode of transportation at the destination. In the illustrated embodiment, a cargo container 146 of the type conventionally used for container shipping aboard containerized cargo ships is of a conventional size, namely forty feet in length, eight feet in width and eight feet in height. This standard size unit having a pair of doors 148 and 150 at one end is filled with selected size cargo units formed in puzzle fashion to fit within the container cargo space forming specific size and weight units, and of a similar size weight to fit cargo space of a series of cargo handling vehicles at the destination.

By way of example, as shown in FIG. 9, a vehicle 152 has a cargo space of approximately four feet in width and six feet in length. Bales of hay are formed in cargo units sized to fit this cargo space, and with other units fit into the cargo space of the shipping container 146. A vehicle 154 has a cargo space having a general dimension of about four feet by about eight feet. A cargo vehicle 156 has a cargo space generally illustrated of being on the order of about five feet in width by about eight feet in length. These vehicles may represent small to medium size vans or pickup trucks. A vehicle 158 has a cargo space illustrated as being on the order of eight feet in width and about sixteen feet in length. Such vehicles may be representative of some of those available in certain foreign countries, such as for example in Japan.

In accordance with the illustrated invention, the cargo space of the shipping container 146 is fitted with a plurality of different sized and configured cargo units like a puzzle. As shown in top plan view, a plurality of cargo units of identical configuration and weight, designated by the numeral 160, are fitted in a portion of the cargo container. These cargo units may be equivalent for example to that illustrated in FIG. 7, having a dimension of approximately four feet in width, eight feet in length and four feet in height. Two such units may stack, one on top of the other, in spaces designated at 160.

At least a pair of identical cargo units 162 having the peripheral dimensions of four by four and possibly the height also of four feet may be stacked in a space in the container fitting the eight foot space between the walls and the eight foot space between the floor and ceiling thereof. Thus, the space occupied by the units 162 may constitute four units. These units may fit for example the cargo space of the vehicles 152 and 154 as illustrated.

Cargo units 164 represent units having at least a peripheral dimension of five feet in width and eight feet in length. These may also preferably have a four foot height, and therefore two of such units may stack and fill the space between the lateral walls and the floor and ceiling of the container. Similarly, one or more of these cargo units may fit a vehicle cargo space of a vehicle 156.

A pair of cargo units 166 and 168 are fitted into a space between the side walls of the container. The cargo unit 166 represents at least a peripheral dimension of four foot in width and six foot in length. Two such units may be stacked, one on top of the other, and a pair of units 168 having a dimension of two feet in width by four feet in length and perhaps four feet in height fill the additional space therein. The cargo unit 166 may, in this example, fit for example the cargo space vehicle 152. In a similar manner, the two combined cargo units 166 and 168 may also fit the cargo space of the vehicle 154.

A pair of the cargo units 166 may also be arranged in a lengthwise direction, one side by side as illustrated, extending between the side walls of the cargo container. These units as also illustrated may fit the cargo units or spaces of vehicles 152 and 154.

A pair of identical cargo units 168 having the peripheral dimensions of four by four, and preferably a height for example of four feet, fill a space between the side walls of the container. These units may fit for example into the cargo spaces of vehicles 152 and 154. In the cargo unit 152, an additional cargo unit 168 may also be provided to fill the cargo space. The remainder of the cargo container 146 is filled by a plurality of the smaller cargo units 168. These may, as in the illustrated embodiment, be used in conjunction with additional units for fill-in space.

The cargo space of the vehicle 158 may be filled with four of the cargo units 160, as illustrated, or various other combinations of the cargo units. For example, any one of the 160 units may be replaced by a 166 unit and a 168 unit or by two of the 162 units. Similarly, it may be replaced by one of the 162 units and two of the 168 units. In summary, various combinations of the units may be selectively positioned in combination with other units in various cargo spaces.

While we have illustrated and described our invention by means of specific embodiments, it should be understood that numerous changes and modifications may be made therein without departing from the spirit and scope of the invention as defined in the appended claims. We further assert and sincerely believe that the above specification together with the accompanying drawings contains a written description of the invention and the manner and process of making and using it, in such full, clear, concise, and exact terms as to enable any person skilled in the art to which it pertains, or with which it is most nearly concerned, to make and use the same, and further that it sets forth the best mode contemplated by us for carrying out the invention.

We claim:

1. A method of unitizing and containerized shipping of a cargo consisting of multiple substantially identical high density bales of hay, comprising:
   forming said bales into a plurality of non-palletized cargo units of selected different sizes which together fit the cargo space of a shipping container and are capable of being handled by a forklift truck, selected units of which alone or in combination fit motor vehicle cargo spaces, comprising the steps of:
   selecting a plurality of substantially identical size and weight high density partially compressible bales of hay;
   arranging said plurality of bales of hay into multiple stacks of a plurality of non-palletized cargo units of selected different sizes, each stack consisting of multiple coextensive layers of multiple horizontal rows having coextensive peripheral sides;
   binding each of said multiple stacks into a non-palletized unit solely by the application of a continuous inward directed lateral force on the peripheral sides of said stack, thereby at least partially compressing each of said bales and forcing the vertical surfaces of the bales into partially interlocking binding engagement with laterally adjacent bales for holding them against vertical movement relative to one another, said application of a continuous lateral force carried out by the step of wrapping multiple layers of an elongated continuous sheet of pre-stretched polymeric film having a memory horizontally around the sides of said plurality of bales of hay, thereby forcing said bales into binding engagement with laterally adjacent bales for binding said stack as a unit without bottom engaging support while maintaining said bottom bale layer in place due to said partially interlocking of the vertical surfaces of the bales for support by direct engagement of said bottom surface on a pair of tines of a forklift truck without a pallet; and
   loading selected combinations of said different size cargo units into said shipping container in a manner to substantially fill the cargo space therein so that said cargo units may be unloaded by directly engaging a bottom surface of each stack by forks of a forklift truck.

2. A method according to claim 1 wherein the step of wrapping includes selecting the sheet of film to have a thickness of from about one to three mil and stretching said film from between about 25% to 220%.

3. A method according to claim 2 wherein said step of wrapping includes applying the film to overlap top and bottom edges of said stack and is applied in from about five to about eight layers.

4. A method according to claim 3 wherein said stacks are arranged to have multiple layers of said multiple horizontal rows of bales.

5. A method according to claim 4 wherein said stacks have a top layer and a bottom layer and at least said top and said bottom layers are wrapped to have from about four to about ten layers of film around the peripheral sides thereof.

6. A method according to claim 5 wherein the step of wrapping said sheet of film is carried out by carrying a roll of film around said stack by means of a rotating arm.

7. A method according to claim 5 wherein the step of wrapping said sheet of film is carried out by rotating said stack of bales while holding a roll of film one side of an axis of rotation of said stack.

8. A method of densifying and non-palletized unitization of multiple bales of hay into multiple size cargo units for containerized shipping comprising:
   selecting a plurality of standard bales of hay having a standard length;
   selecting predetermined fixed weight positions of said plurality of bales of hay and forming each of said portions by compressing into a bale of said predetermined fixed weight and having a length less than one-half said standard length;
   banding said compressed bale with spaced apart bands;
   arranging said plurality of bales into at least two different size stacks of at least a first layer of multiple rows defining a periphery, said stacks having peripheral dimensions for taking in selected combinations for fitting into at least two different size cargo spaces;
   binding said plurality of bales into a self-supporting unit solely by the application of a continuous inwardly directed lateral force on the peripheral sides of said stack, thereby at least partially compressing each of said bales and forcing vertical surfaces of the bales into partially interlocking binding engagement with laterally adjacent bales for holding them against vertical movement relative to one another, said application of a continuous lateral force carried out by the steps of selecting and wrapping multiple layers of a pre-stretched polymer film snugly around the periphery of each of said stacks of bales forming each into a cargo unit without bottom engaging support while maintaining said first layer in place due to said partially interlocking of the vertical surfaces of the bales for support by direct engagement of a bottom surface of said layer on a pair of tines of a forklift truck without a pallet; and
   selectively fitting said cargo units into a standard cargo container in a manner to substantially fill the cargo space therein.

9. A method according to claim 8 wherein said step of arranging said bales into a stack comprises arranging said bales into a plurality of said layers.

10. A method according to claim 9 wherein said step of wrapping comprises applying from about four to about ten layers of said film.

11. A method according to claim 10 wherein the step of selecting said film comprises selecting said film to have a thickness of from about one to three mil and is stretched from between about 25% to 220%.

12. A method according to claim 11 wherein said stack includes top and bottom layers and at least said top and said bottom layers have from about four to about ten layers of film around the periphery thereof.

13. A method according to claim 8 wherein said arranging said plurality of bales into different size stacks includes forming said stacks having peripheral dimensions for taking in selected combinations for fitting into a shipping container and for taking individually for fitting a cargo space at a point of delivery.

14. A method according to claim 8 wherein said selectively fitting said cargo units into a standard cargo container in a manner to substantially fill the cargo space therein includes selecting said units having peripheral dimensions taken from the group consisting of four feet by eight feet, five feet by eight feet, four feet by four feet, three feet by four feet, two feet by four feet and four feet by six feet.

15. A method according to claim 14 wherein the selecting of said cargo units includes selecting said units to have a height of about four feet.

16. A method of unitizing and containerized shipping of a cargo consisting of multiple substantially identical high density bales of hay, comprising the steps of:

selecting and forming a plurality of standard bales of hay into a plurality of substantially uniform size and weight high density bales of a length less than half that of the standard bales;

arranging said plurality of high density bales of hay into multiple stacks of multiple coextensive layers of multiple rows defining cargo units of selected different sizes, said cargo units sized so that together they fit the cargo space of a shipping container and so that selected units alone or in combination fit motor vehicle cargo spaces;

binding each of said multiple stacks into a non-palletized unit solely by the application of a continuous inward directed lateral force on the peripheral sides of said stack, thereby at least partially compressing each of said bales and forcing vertical surfaces of the bales into partially interlocking binding engagement with vertical surfaces laterally adjacent bales for holding them against vertical movement relative to one another, said application of a continuous lateral force comprising the step of wrapping multiple layers of an elongated continuous sheet of pre-stretched polymeric film having a memory horizontally around the sides of said plurality of bales of hay, thereby forcing said bales into binding engagement with laterally adjacent bales for binding said stack together as a unit without bottom engaging support while maintaining a bottom layer of said stack in place due to said partially interlocking of the vertical surfaces of the bales for support by direct engagement of a bottom surface of said bottom layer on a pair of tines of a forklift truck without a pallet; and selecting and loading selected combinations of said different size cargo units into a cargo shipping container in a manner to substantially fill the cargo space therein.

17. A method according to claim 16 wherein said step of selecting and forming a plurality of standard bales of hay into a plurality of substantially uniform size and weight high density bales includes selecting uniform portions from a series of broken bales and feeding said uniform portions through a press.

18. A method according to claim 17 wherein said step of arranging said bales into said stacks comprises arranging said bales into stacks of selected different sizes which together fit the cargo space of a shipping container and wherein selected stacks alone or in combination fit different size motor vehicle cargo spaces.

19. A method according to claim 16 further comprising the step of cutting said high density bales into two first and second bales of about one-half a standard bale width.

20. A method according to claim 16 further comprising the step of unloading said cargo units by means of a forklift truck.

21. A method according to claim 16 wherein said selectively fitting said cargo units into a standard cargo container in a manner to substantially fill the cargo space therein includes selecting said units having peripheral dimensions taken from the group consisting of four feet by eight feet, five feet by eight feet, four feet by four feet, three feet by four feet, two feet by four feet and four feet by six feet.

22. A method according to claim 20 wherein the selecting of said cargo units includes selecting said units to have a height of about four feet.

* * * * *